US012684205B2

(12) United States Patent
Rhee et al.

(10) Patent No.: US 12,684,205 B2
(45) Date of Patent: Jul. 14, 2026

(54) VIDEO PROCESSING METHOD AND VIDEO PROCESSING APPARATUS

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Hochang Rhee, Seoul (KR); Nam Ik Cho, Seoul (KR); Young Hun Sung, Suwon-si (KR); Dokwan Oh, Suwon-si (KR); Hyo A Kang, Suwon-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 100 days.

(21) Appl. No.: 18/740,169

(22) Filed: Jun. 11, 2024

(65) Prior Publication Data

US 2025/0039519 A1     Jan. 30, 2025

(30) Foreign Application Priority Data

Jul. 27, 2023    (KR) ........................ 10-2023-0098300

(51) Int. Cl.
 *H04N 21/845* (2011.01)
 *H04N 21/234* (2011.01)
(52) U.S. Cl.
 CPC ... *H04N 21/8456* (2013.01); *H04N 21/23424* (2013.01)
(58) Field of Classification Search
 CPC .................................................. G06N 3/0455
 See application file for complete search history.

(56) References Cited

U.S. PATENT DOCUMENTS

| | | | |
|---|---|---|---|
| 11,557,123 B2 | 1/2023 | Yang et al. | |
| 2014/0274297 A1* | 9/2014 | Lewis | H04N 21/8549 463/20 |
| 2021/0398257 A1* | 12/2021 | Wang | G06V 10/14 |
| 2022/0248040 A1 | 8/2022 | Xu et al. | |
| 2022/0272312 A1* | 8/2022 | Zhu | G06V 20/70 |

(Continued)

FOREIGN PATENT DOCUMENTS

| | | |
|---|---|---|
| CN | 115019225 A | 9/2022 |
| CN | 110175566 B | 12/2022 |

(Continued)

OTHER PUBLICATIONS

Zhao Q, Asif MS, Ma Z. Dnerv: Modeling inherent dynamics via difference neural representation for videos. InProceedings of the IEEE/CVF Conference on Computer Vision and Pattern Recognition 2023 (pp. 2031-2040). (Year: 2023).*

(Continued)

*Primary Examiner* — Clifford Hilaire
(74) *Attorney, Agent, or Firm* — Sughrue Mion, PLLC

(57) ABSTRACT

A video processing method is provided. The video processing method obtaining a clip representation based on a frame index and a global representation of an input video, obtaining a residual frame representation based on the frame index and a residual representation of the input video using a residual neural network and outputting a final frame representation generated based on the clip representation and the residual frame representation.

20 Claims, 14 Drawing Sheets

(56) References Cited

U.S. PATENT DOCUMENTS

| | | | |
|---|---|---|---|
| 2022/0335246 A1 | 10/2022 | Bin W Mohamad Fablillah et al. | |
| 2023/0105436 A1* | 4/2023 | Du | G06N 3/045 |
| | | | 375/240.02 |
| 2023/0291978 A1* | 9/2023 | He | H04N 21/4884 |
| 2024/0163479 A1* | 5/2024 | Azevedo | H04N 19/42 |

FOREIGN PATENT DOCUMENTS

| | | |
|---|---|---|
| CN | 111738908 B | 4/2023 |
| CN | 111179314 B | 5/2023 |
| CN | 111401267 B | 6/2023 |
| CN | 116071690 B | 6/2023 |
| KR | 10-2459775 B1 | 10/2022 |

OTHER PUBLICATIONS

Duke B, Ahmed A, Wolf C, Aarabi P, Taylor GW. Sstvos: Sparse spatiotemporal transformers for video object segmentation. InProceedings of the IEEE/CVF conference on computer vision and pattern recognition 2021 (pp. 5912-5921). (Year: 2021).*

He B, Yang X, Wang H, Wu Z, Chen H, Huang S, Ren Y, Lim SN, Shrivastava A. Towards scalable neural representation for diverse videos. InProceedings of the IEEE/CVF Conference on Computer Vision and Pattern Recognition 2023 (pp. 6132-6142). (Year: 2023).*

Mildenhall, B., Srinivasan, P. P., Tancik, M., Barron, J. T., Ramamoorthi, R., & Ng, R. (2021). Nerf: Representing scenes as neural radiance fields for view synthesis. Communications of the ACM, 65(1), pp. 99-106.

Chen, H., He, B., Wang, H., Ren, Y., Lim, S. N., & Shrivastava, A. (2021). Nerv: Neural representations for videos. Advances in Neural Information Processing Systems, 35th Conference on Neural Information Processing Systems (NeurIPS 2021), 12 pages.

Li, Z., Wang, M., Pi, H., Xu, K., Mei, J., & Liu, Y. (2022). E-NeRV: Expedite Neural Video Representation with Disentangled Spatial-Temporal Context. Computer Vision—ECCV 2022: 17th European Conference, Tel Aviv, Israel, Oct. 23-27, 2022, Proceedings, Part XXXV, pp. 267-284, arXiv:2207.08132v1 [cs.CV].

Müller, T., Evans, A., Schied, C., & Keller, A. (2022). Instant neural graphics primitives with a multiresolution hash encoding. ACM Transactions on Graphics (ToG), 41(4), pp. 1-15.

* cited by examiner

FIG. 1

VIDEO PROCESSING METHOD AND VIDEO PROCESSING APPARATUS

CROSS-REFERENCE TO RELATED APPLICATION(S)

This application claims priority from Korean Patent Application No. 10-2023-0098300, filed on Jul. 27, 2023, in the Korean Intellectual Property Office, the entire disclosure of which is incorporated herein by reference for all purposes.

BACKGROUND

1. Field

Embodiments of the disclosure relate to a video processing method and a video processing apparatus.

2. Description of the Related Art

Recently, devices and services related to providing videos on the internet is growing rapidly. A video contains a much larger amount of data compared to media such as voice, text, photo, etc., and as such, a high-level video compression technology is required, since the type or quality of services may be limited by network bandwidth. To this end, there have been proposed techniques of neural network-based video compression capable of end-to-end training by replacing components of general video compression technology with neural networks.

SUMMARY

Aspects of the disclosure provide a video processing apparatus and a video processing method in consideration of temporal redundancy of a video.

According to an aspect of the disclosure, there is provided a video processing method including: obtaining a clip representation based on a frame index and a global representation of an input video; obtaining a residual frame representation based on the frame index and a residual representation of the input video using a residual neural network; and outputting a final frame representation generated based on the clip representation and the residual frame representation.

According to another aspect of the disclosure, there is provided a video processing apparatus including: a memory storing one or more instructions; and a processor configured to execute the one or more instructions to: obtain a clip representation based on a frame index and a global representation of an input video; obtain a residual frame representation based on the frame index and a residual representation of the input video using a residual neural network; and output a final frame representation generate based on the clip representation and the residual frame representation.

According to another aspect of the disclosure, there is provided an electronic device including: a storage configured to store a video; a video processing apparatus configured to process the video and output a result of the processing; and wherein the video processing apparatus includes: a memory storing one or more instructions; and a processor configured to execute the one or more instructions to: obtain a clip representation based on a frame index and a global representation of an input video; obtain a residual frame representation based on the frame index and a residual representation of the input video using a residual neural network; and output a final frame representation generate based on the clip representation and the residual frame representation.

BRIEF DESCRIPTION OF DRAWINGS

FIG. 1 is a block diagram illustrating a video processing apparatus according to an embodiment of the disclosure.

DETAILED DESCRIPTION

Figure 2A:
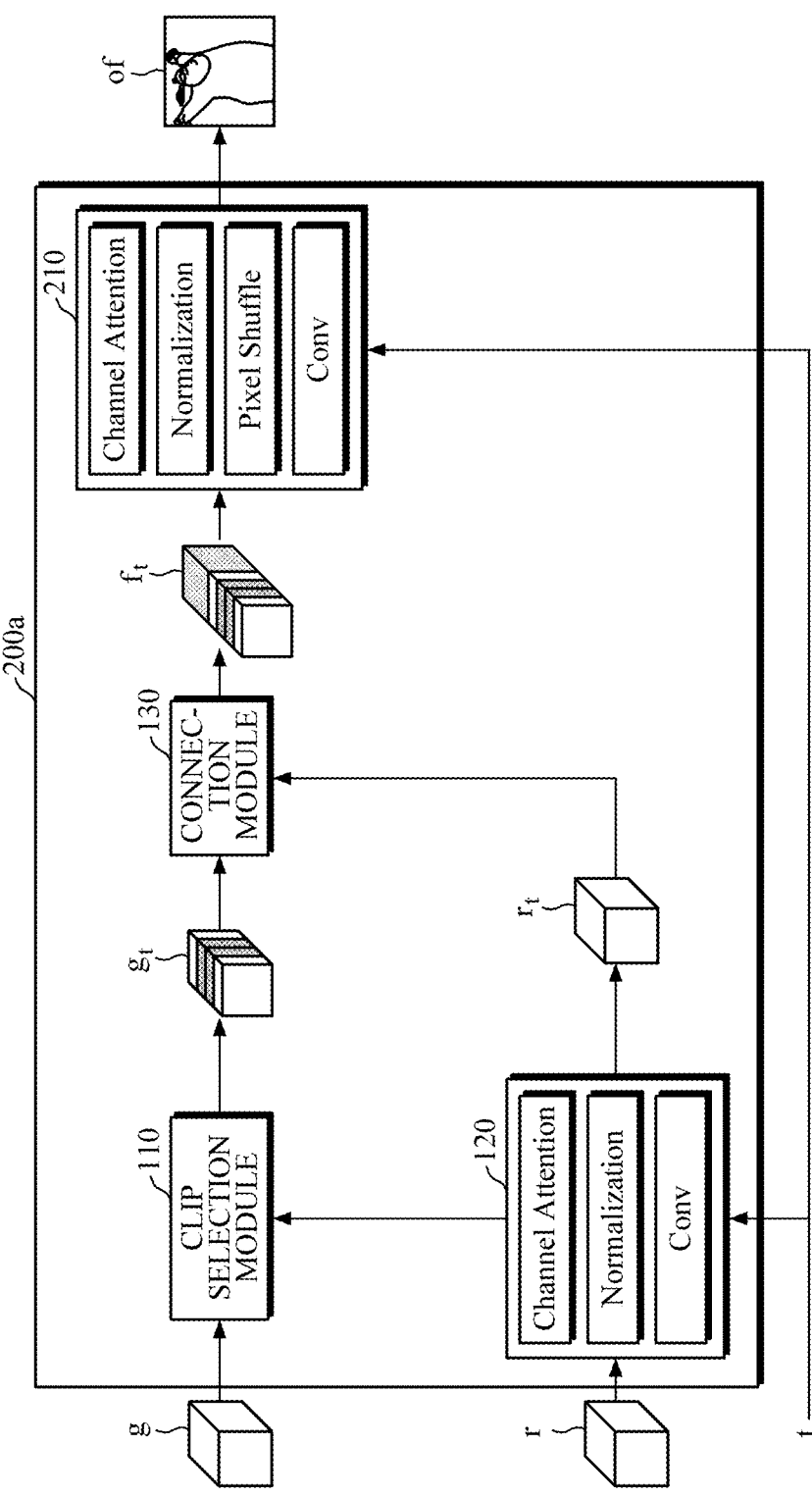
FIGS. 2A and 2B are block diagrams illustrating a video processing apparatus according to other embodiments of the disclosure.

Hereinafter, various embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to,"

are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The terms, such as "unit" or "module," etc., should be understood as a unit that performs at least one function or operation and that may be embodied as hardware, software, or a combination thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

Figure 1:
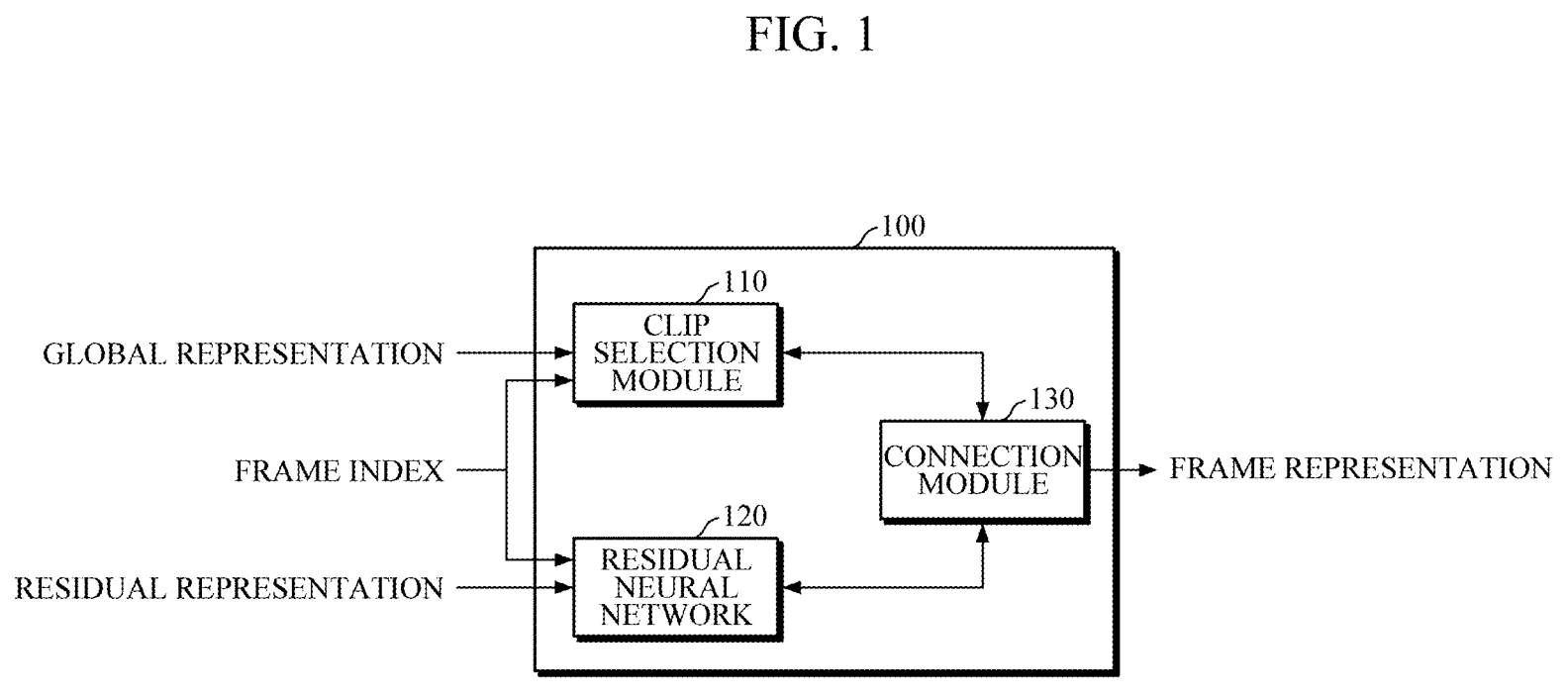

FIG. 1 is a block diagram illustrating a video processing apparatus according to an embodiment of the disclosure.

According to an embodiment, the video processing apparatus may be mounted in any one of various electronic devices, such as mobile phones, televisions (TV), monitors, Internet of Things (IoT) devices, and the like. The video processing may include video compression, decoding, etc. However, the disclosure is not limited thereto, and as such, may include other types processing.

Referring to FIG. 1, a video processing apparatus 100 may include a clip selection module 110, a residual neural network 120, and a connection module 130. The clip selection module 110 and the residual neural network 120 may form a network. The clip selection module 110, the residual neural network 120, and the connection module 130 may be implemented as a hardware chip or a software module. According to embodiment, in a case of the video processing apparatus 100 including a hardware chip, the clip selection module 110 may be implemented as a chip selection circuitry, the residual neural network 120 may be implemented as a residual neural network circuitry, and the connection module 130 may be implemented as a connection circuitry. According to another embodiment, According to embodiment, in a case of the video processing apparatus 100 including a software module, the clip selection module 110 may include clip selection code, program or instruction, the residual neural network 120 may include residual neural network code, program or instruction, and the connection module 130 may include connection code, program or instruction. Moreover, a processor may execute the code in modules 110, 120 and/or 130 to perform one or more operations of the video processing apparatus 100. However, the disclosure is not limited thereto, and as such, according to another embodiment, these components 110, 120 and 130 may be implemented as two or more hardware or software modules, or a combination thereof.

The clip selection module 110 may output a clip representation by using a frame index and a global representation of an input video as input. For example, the clip selection module 110 may receive the frame index and the global representation of the input video as input and obtain a clip representation based on the frame index and the global representation of the input video. The frame index may refer to a time step of a video. The global representation indicates or shows overall features of the input video. The global representation may be obtained by performing a preprocessing operation on the input video. The global representation may be a value independent of the frame index.

The clip selection module 110 may divide the global representation into a plurality of clips, and may create a clip representation by selecting one or more of the plurality clips and connecting the selected clips. For example, the clip selection module 110 may obtain the clip representation by selecting at least some of the divided clips and combining the selected clips. In an example case, the clip selection module 110 may adaptively divide the global representation by considering video characteristics. For example, the video characteristics may be whether the video is static or dynamic, or whether there is a scene change, and the like.

In the following description, the term "representation" may refer to a feature, latent vector, information and the like. For example, the clip representation may be referred to as clip representation information and the global representation may be referred to as global representation information.

According to an embodiment, the residual neural network 120 may receive the frame index and a residual representation of the input video as input, and output a residual frame representation which is a residual value corresponding to the frame index. For example, the residual neural network 120 may obtain the residual frame representation based on the frame index and a residual representation of the input video and output the residual frame representation. Here, the residual representation as an input is a residual value from the global representation, and may be obtained by performing a preprocessing operation on the input video. The residual neural network 120 may be a Convolutional Neural Network (CNN).

The connection module 130 may output a final frame representation by connecting the clip representation, which is the output of the clip selection module 110, and the residual frame representation which is the output of the residual neural network 120. For example, the connection module 130 may receive the clip representation and the residual frame representation, and obtain the final frame representation based on the clip representation and the residual frame representation. In an example case, the connection module 130 may use a concatenation operation. The frame representation which is finally output may represent a difference in feature space between a global representation and a residual representation corresponding to a specific frame index.

According to an embodiment illustrated in FIG. 1, the representation of a video is divided into the global representation and the residual representation, and the global representation and the residual representation are trained and processed by the clip selection module 110 and the residual neural network 120, respectively, thereby allowing the entire network to train and process the video in consideration of temporal redundancy. For example, an output from the connection module 130 may be used by the clip selection module 110 and the residual neural network 120 for training and/or processing. For example, an output from the connection module 130 may be used by the clip selection module 110 and the residual neural network 120 for training a clip selection model and/or a residual model.

Figure 2B:
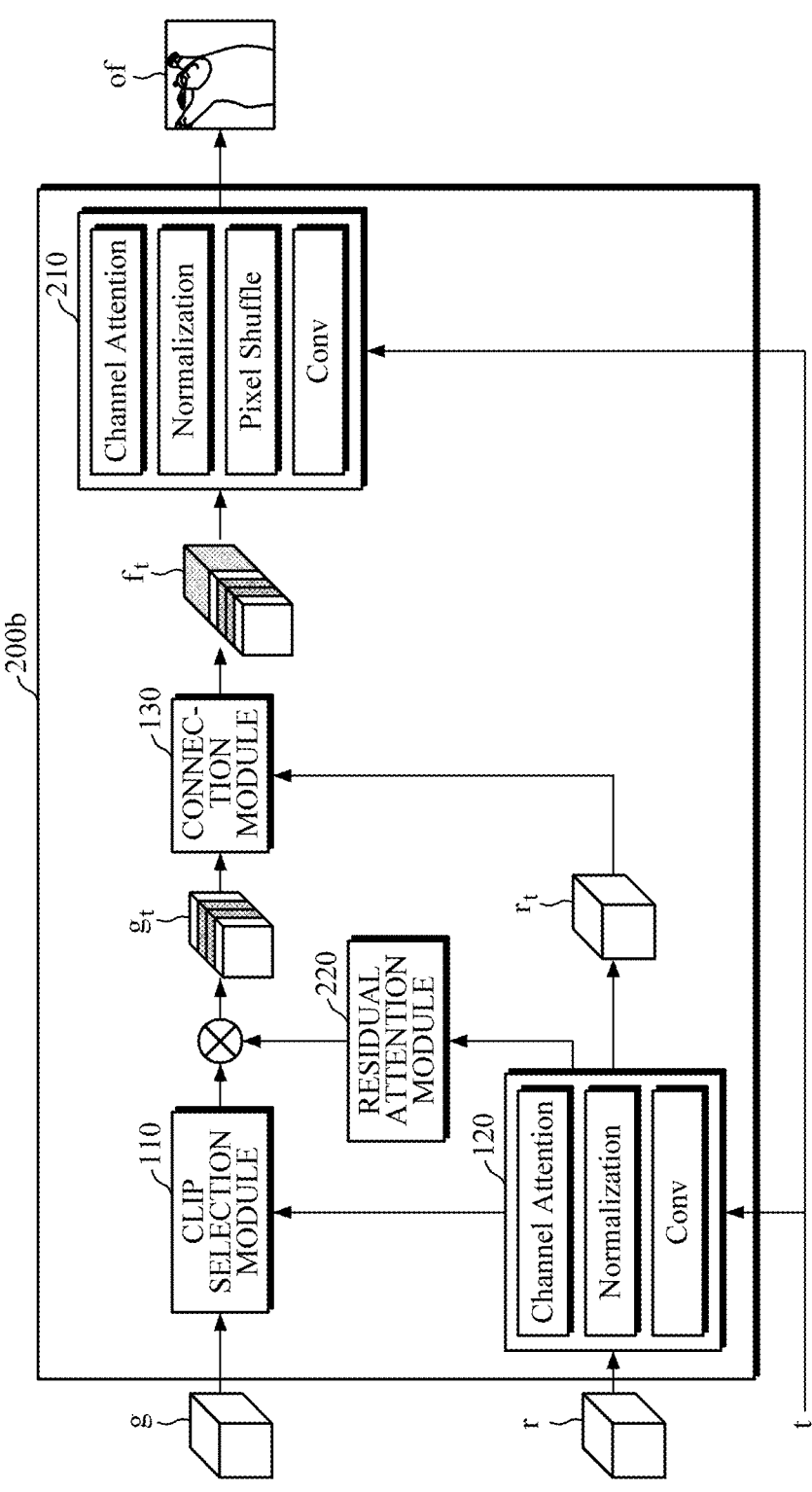

FIGS. 2A and 2B are block diagrams illustrating a video processing apparatus according to other embodiments of the disclosure. FIGS. 3A to 3D are diagrams explaining operation of a clip selection module.

Referring to FIG. 2A, a video processing apparatus 200a may include the clip selection module 110, the residual neural network 120, the connection module 130, and a decoder 210. Referring to FIG. 2B, the video processing apparatus 200b may further include a residual attention module 220 as compared to the video processing apparatus 200a in FIG. 2A.

Figure 3A:
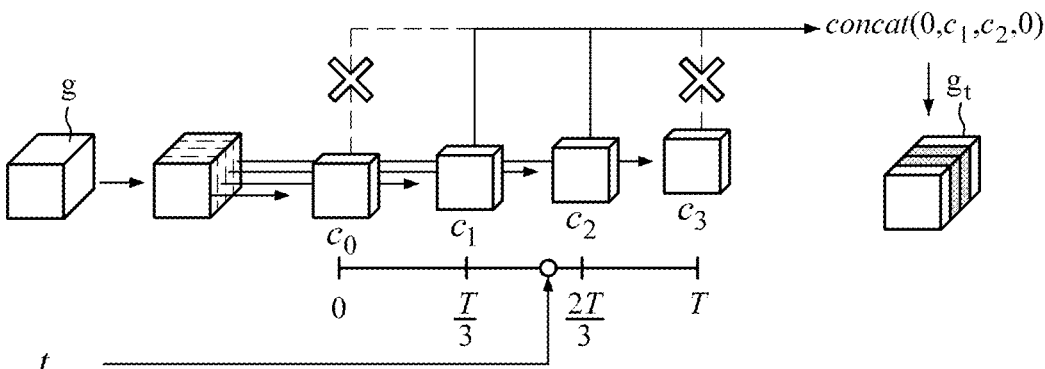
FIGS. 3A to 3D are diagrams explaining operation of a clip selection module.

Referring to FIGS. 2A, 2B, and 3A, the clip selection module 110 may receive input of a global representation g and a frame index t, and may output a clip representation $g_r$. Referring to FIG. 3A, the clip selection module 110 may divide the global representation g into a plurality of clips. For example, the clip selection module 110 may divide the global representation g into a predetermined number of clips $c0$, $c1$, $c2$, and $c3$. According to an embodiment, the plurality of clips may be divided into equal size. In an example, each of the divided clips may reflect a feature at a specific time over the entire period of 0 to T. Although four (4) clips $c0$, $c1$, $c2$, and $c3$ are illustrated according to an embodiment in FIG. 3A, the disclosure is not limited thereto, and as such, the number of divided clips may be less than or greater than four.

According to an embodiment, at least some clips $c1$ and $c2$ to be used in video processing may be selected from among the divided clips $c0$, $c1$, $c2$, and $c3$ based on the frame index t. One or more clips may be selected based on a distance in time between each of the plurality of clips and a point corresponding to the frame index t. For example, clips $c1$ and $c2$, which are close in time to the frame index t and on both sides of the frame index t, may be selected. For example, in FIG. 3A, clip $c1$ is provided on the left side of the frame index t and clip $c2$ is provided on the right side of the frame index t. In this manner, only a feature associated with the frame index in the global representation may be used in video processing. To this end, the remaining clips $c0$ and $c3$ which are not selected may be set to zero tensor. The clip representation gr may be output by connecting the selected clips $c1$ and $c2$, and the remaining clips $c0$ and $c3$ that are set to zero tensor.

According to an embodiment, by using the clip selection module, a video may be trained and processed by using only the representation associated with the current frame in the global representation, thereby improving the efficiency of training and processing the video, compared to the case of training and processing by using all the representations that are unrelated to the current frame.

Figure 3B:
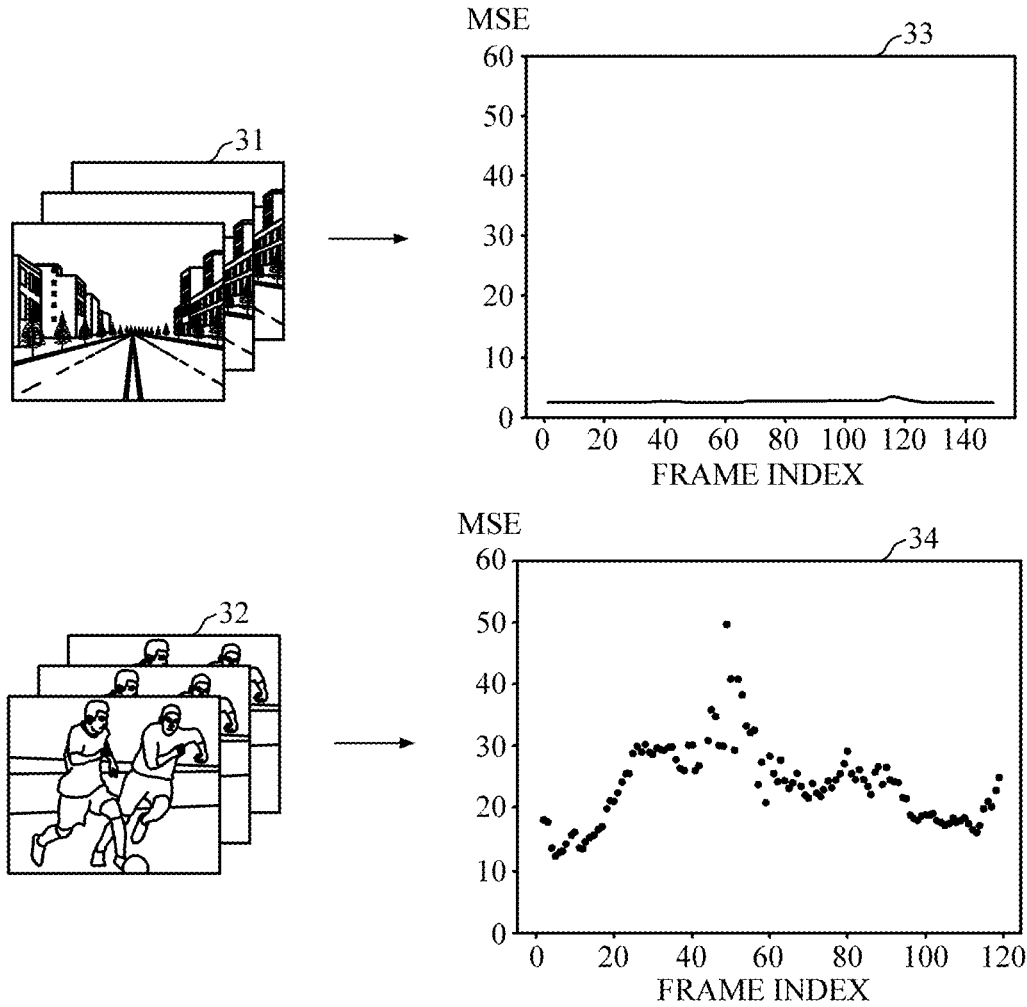

Referring to FIG. 3B, the clip selection module 110 may determine whether the input video is a static video 31 or a dynamic video 32. The clip selection module 110 may calculate a difference between two frames (e.g., adjacent frames) of the input video, and determine whether the input video is static or dynamic based on the difference. For example, the clip selection module may obtain a Mean Squared Error (MSE) between two frames, and in a case in which the MSE is less than or equal to a threshold value, the clip selection module 110 may determine that the input video is static, and in a case in which the MSE exceeds the threshold value, the clip selection module 110 may determine that the input video is dynamic. The threshold value may be a predetermined value. A graph 33 shows the MSE of the static video 31, and a graph 34 shows the MSE of the dynamic video 32.

According to an embodiment, based on the determination that the input video is the static video or the dynamic video, the clip selection module 110 may adjust the number of clips to be divided. For example, the clip selection module 110 may adaptively adjust the number of clips to be divided based on the input video being a static video or a dynamic video. Generally, the overall change in the static video is small, such that even when the frame index is different, the difference in features is not large. By contrast, the overall change in the dynamic video is large, such that there is a large difference in features of each frame index. Accordingly, by dividing the static video into a smaller number (e.g., 2) of clips and dividing the dynamic video into a larger number (e.g., 8) of clips, the efficiency of training and processing of the video may be improved. For example, the static video may be divided into a first number of clips and the dynamic video may be divided into a second number of clips, where the first number is smaller than the second number. The number of the divided clips may be adjusted to a value proportional to the calculated MSE.

Figure 3C:
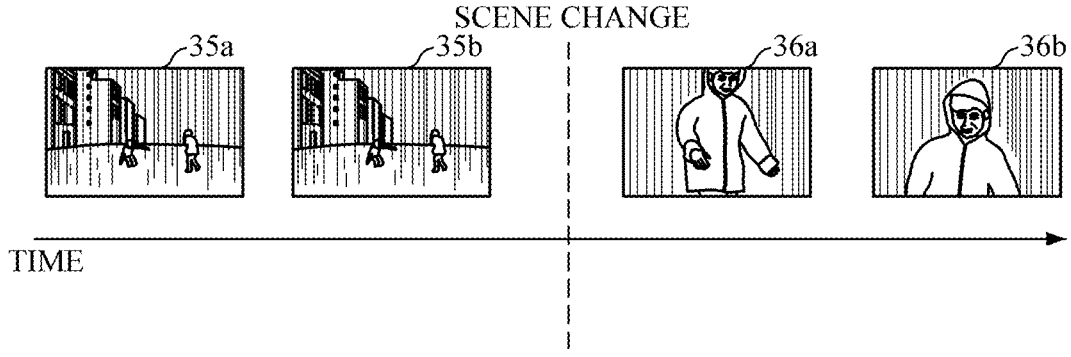
Figure 3D:
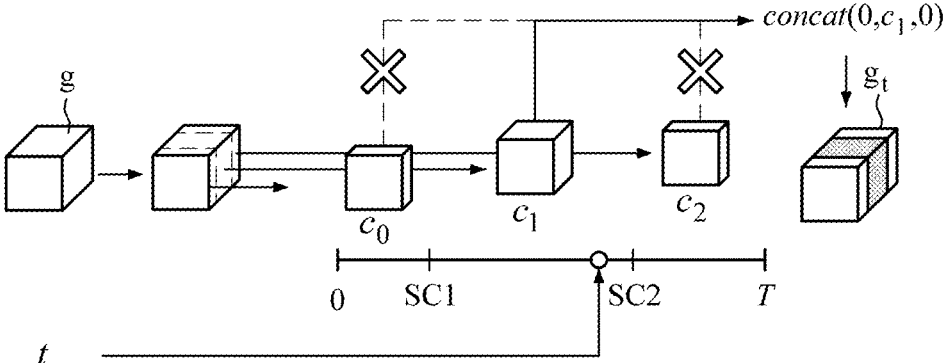

Referring to FIGS. 3C and 3D, the clip selection module 110 may divide the global representation by considering whether there is a scene change in the input video. FIG. 3C is a diagram illustrating an example in which there is a scene change between frames $35a$ and $35b$ and frames $36a$ and $36b$. The clip selection module 110 may detect a scene change point of the input video by using a detection algorithm (e.g., PySceneDetect).

Referring to FIG. 3D, in a case in which there is a scene change, the clip selection module 110 may divide the global representation into clips with different depths. For example, instead of dividing the global representation into equal clips so that features of the global representation are evenly distributed in the respective clips, the clip selection module 110 may divide the global representation into clips with a depth of the clip $c_1$ being different from the other clips $c_0$ and $c_2$, so that more features are centered around scene change points SC1 and SC2. As described above, by indicating that the clips containing frames before and after the scene change are different from each other, the efficiency of training and processing of the video may be improved. After the clip $c_1$, which is close to the frame index t, is selected from among the divided clips, and the other clips $c_0$ and $c_2$ are set to zero tensor, the selected clip $c_1$ is connected to the other clips $c_0$ and $c_2$ that are set to zero tensor, to output the clip representation $g_r$.

Referring back to FIGS. 2A and 2B, the residual neural network 120 may be a Convolutional Neural Network (CNN). As described above, the residual neural network 120 may include Channel Attention, Normalization, and convolution (Conv) layer. However, the residual neural network 120 is not limited thereto and may further include Pixel Shuffle and/or Activation layer. The channel attention may be, for example, coordinate attention. The normalization may be Instance Normalization. The input residual representation r may pass through each layer of the residual neural network 120 to be output as a residual frame representation $r_r$. By performing the channel attention, channels associated with the frame index may be used in training and/or processing an input video, and unrelated channels may be excluded during training and/or processing.

The connection module 130 may connect the clip representation $g_t$ and the residual frame representation $r_t$ and output a final frame representation $f_r$. For example, the connection module 130 may receive the clip representation $g_t$ and the residual frame representation $r_t$ and obtain the final frame representation $f_t$ based on the clip representation $g_t$ and the residual frame representation $r_r$. According to an embodiment, the connection module 130 may use a concatenation operation to concatenate the clip representation $g_t$ and the residual frame representation $r_r$. According to another embodiment, the connection module 130 may connect the clip representation gr and the residual frame representation $r_t$ by using a link function to output a final frame representation $f_r$. According to an embodiment, the connection module 130 may combine the clip representation $g_t$ with the residual frame representation $r_t$ and output a final frame representation $f_r$.

The decoder 210 may output a predicted frame (of) by using the final frame representation $f_t$ as an input. The decoder 210 may be a Convolutional Neural Network, and may include channel attention (e.g., coordinate attention), normalization (e.g., instance normalization), pixel shuffle, and convolution layer. However, the decoder 210 is not limited thereto and may further include an activation layer.

Referring to FIG. 2B, the residual attention module 220 may output an attention map by using, as an input, the output of the convolution (Conv) layer of the residual neural network 120 or the residual frame representation $r_r$. For example, the residual attention module 220 may include one or more pooling layers and a convolutional layer with an output of 1. The attention map output by the residual attention module 220 may be used as the weight of a clip feature which is the output of the clip selection module 110. For example, by applying the feature of the residual neural network 120 to spatial attention of the clip representation, soft masking in space is performed together, so that a region with large residuals is weighted, thereby increasing the efficiency of training and processing the global representation in the region. In this manner, dynamic characteristics of a video may be accurately reflected in the case of inaccurate spatial alignment between the output of the residual neural network 120 and the output of the clip selection module 110. For example, in a video with large motion, there may be a large difference between the attention map and the clip representation $g_r$, such that by adjusting the kernel size of the layer to a size of a receptive field that is proportional to the mean of residual values (e.g., MSE) of a video, the difference may be compensated.

Figure 4:
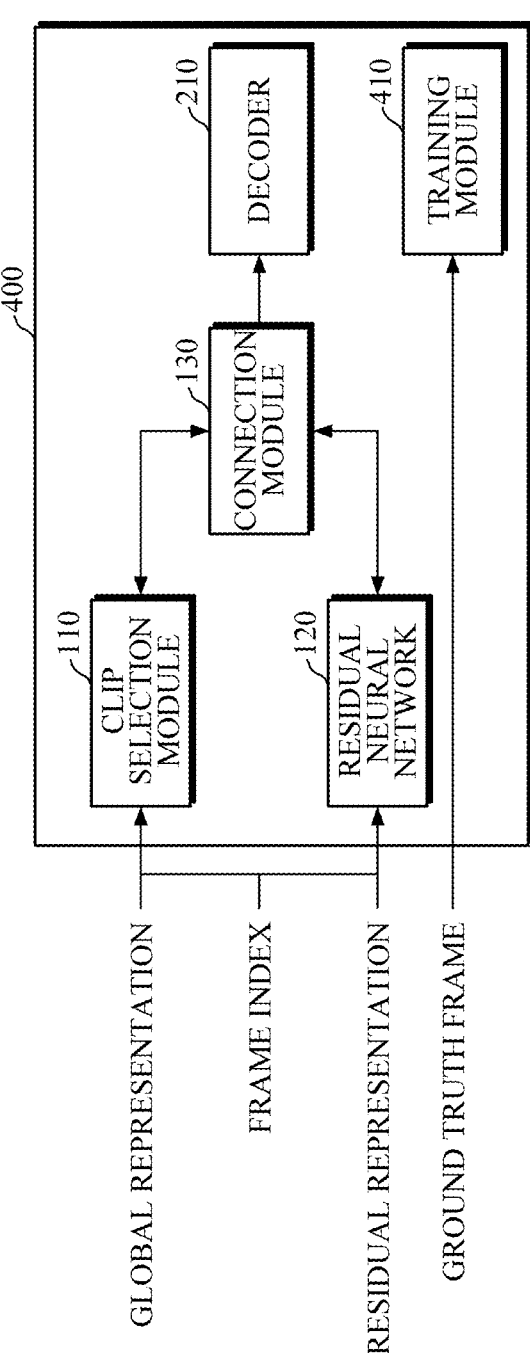
FIG. 4 is a block diagram illustrating a video processing apparatus according to another embodiment of the disclosure.

FIG. 4 is a block diagram illustrating a video processing apparatus according to another embodiment of the disclosure.

Referring to FIG. 4, a video processing apparatus 400 includes the clip selection module 110, the residual neural network 120, the connection module 130, the decoder 210, and a training module 410. The clip selection module 110, the residual neural network 120, the connection module 130, and the decoder 210 are described in detail above, such that a detailed description thereof will be omitted below.

The training module 410 may train the entire network of the apparatus 400 by using the predicted frame, output by the decoder 210, and a ground truth frame. The training module 410 may train the network by using a Back-Propagation method. By setting various loss functions, the training module 410 may train a network, such as the clip selection module 110, the residual neutral network 120, the decoder 210, etc., so that the residual between the predicted frame and the ground truth frame may be minimized. In this case, the loss function may include Peak Signal-to-Noise Ratio (PSNR) loss, Mean Squared Error (MSE), Cross-Entropy Loss, Binary Cross-Entropy Loss, Log Likelihood Loss, frequency domain loss, etc., but is not limited thereto.

According to an embodiment, by training the clip selection module 110 and the residual neural network 120 to separately process the global representation and the residual representation, temporal redundancy may be considered during video processing. Further, training is performed by considering whether the video is static or dynamic, whether there is a scene change, etc., such that the global representation may be adaptively divided into clips based on video characteristics during inference.

Figure 5:
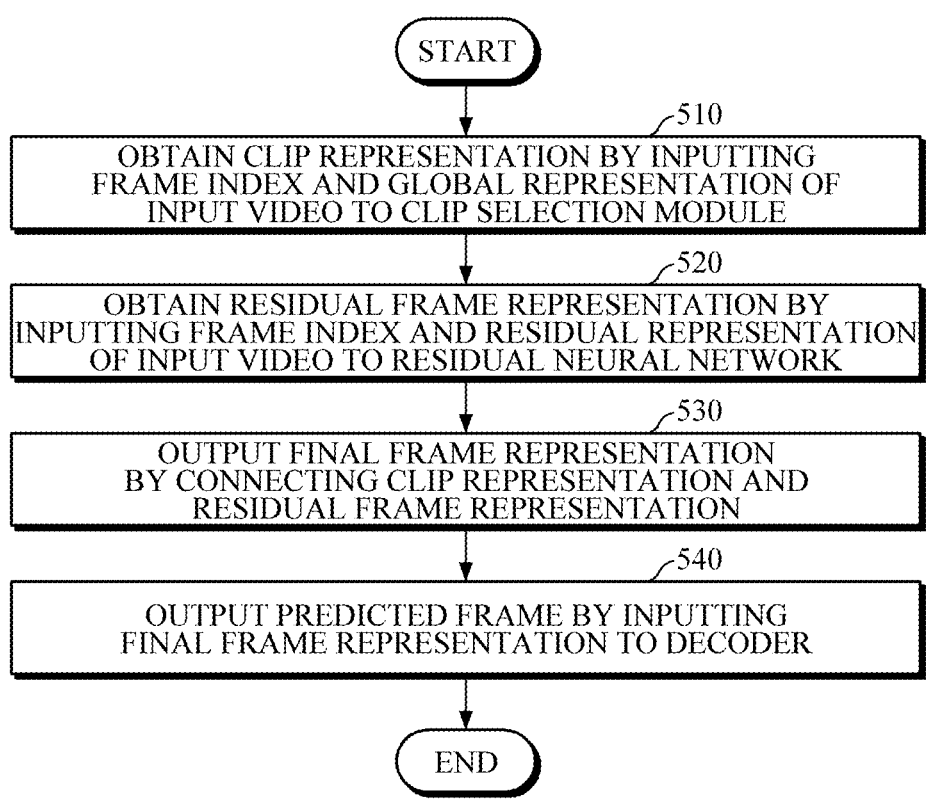
FIG. 5 is a flowchart illustrating a video processing method according to an embodiment of the disclosure.
Figure 6:
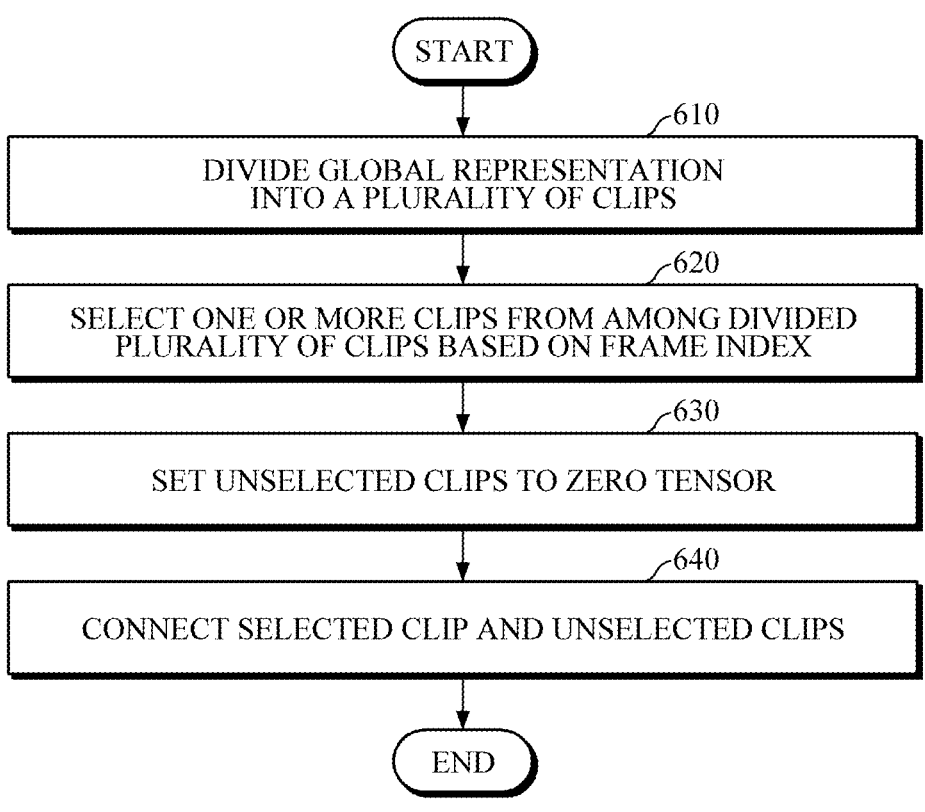
FIG. 6 is a flowchart illustrating an example of outputting a clip representation according to an embodiment of the disclosure.
Figure 7A:
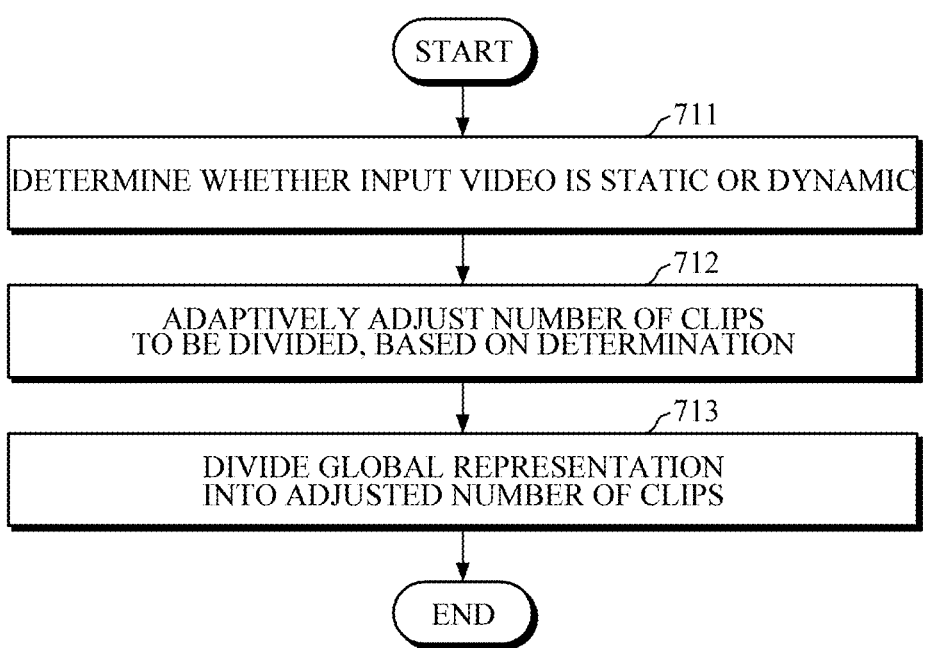
FIGS. 7A and 7B are flowcharts illustrating an example of dividing into clips according to embodiments of the disclosure.
Figure 7B:
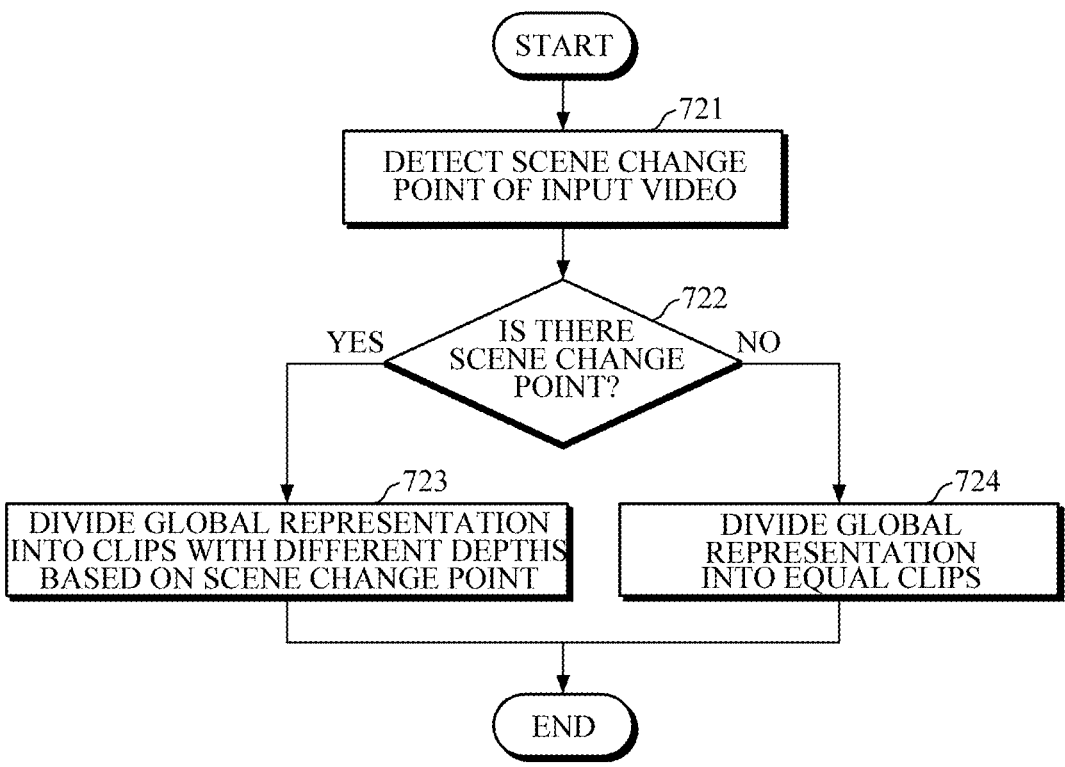

FIG. 5 is a flowchart illustrating a video processing method according to an embodiment of the disclosure. FIG. 6 is a flowchart illustrating an example of outputting a clip representation according to an embodiment of the disclosure. FIGS. 7A and 7B are flowcharts illustrating an example of dividing into clips according to embodiments of the disclosure.

FIGS. 5, 6, 7A and 7B illustrate an example of a video processing method performed by the video processing apparatuses 100, 200a, and 200b described above, which will be briefly described below in order to avoid redundancy. One or more of the operations illustrated in FIGS. 5, 6, 7A and 7B may be omitted or an order of the operations may be changed according to another embodiment.

According to an embodiment illustrated in FIG. 5, in operation 510, the method includes obtaining a clip representation by inputting a frame index and a global representation of an input video. For example, the video processing apparatus may output a clip representation by inputting a frame index and a global representation of an input video to the clip selection module in 510.

Referring to FIG. 6, the outputting of the clip representation in operation 510 may include dividing the global representation into a plurality of clips (operation 610), selecting one or more clips from among the divided plurality of clips based on the frame index (operation 620), setting remaining clips, which are not selected, to zero tensor (operation 630), and outputting the clip representation (operation 630), by connecting the selected clip and the remaining clips which are set to zero tensor. By selecting clips, which are close to the frame index, while setting the remaining clips to zero tensor, features that are close in time to the frame index may be used in training and processing, thereby improving the efficiency of training and processing.

Referring to FIG. 7A, the dividing of the global representation into the plurality of clips in operation 610 may include determining whether the input video is static or dynamic (operation 711), and based on the determination, adaptively setting the number of clips to be divided (operation 712), and dividing the global representation into the set number of clips (operation 713). For example, the video processing apparatus may calculate a Mean Squared Error (MSE) between adjacent frames of the input video may be calculated, and in a case in which the MSE is less than or equal to a predetermined threshold value, the video processing apparatus may determine that the input video is static, and in a case in which the MSE is not less than or equal to the predetermined threshold value, the video processing apparatus may determine that the input video is dynamic. In a case in which the input video is dynamic, the global representation may be divided into a larger number of clips compared to the number of clips when the input video is static, so that a larger number of features may be used in training and processing of the video.

Referring to FIG. 7B, the dividing of the global representation into the plurality of clips in operation 610 may include detecting a scene change point of the input video (operation 721), determining whether there is a scene change point (operation 722), and in a case in which there is a scene change point, dividing the global representation into clips with different depths based on the scene change point (operation 723). In a case in which there is no scene change point, dividing the global representation into equal clips (operation 724). By dividing the global representation into clips with the depth of some clip being greater than the other clips, so that more features are centered around the scene change point, thereby increasing the efficiency of training and processing the video.

Referring back to FIG. 5, in operation 520, the method may include obtaining a residual frame representation by inputting the frame index and a residual representation of the input video to the residual neural network. For example, the video processing apparatus may output a residual frame representation by inputting the frame index and a residual representation of the input video to the residual neural network. The residual neural network may be a Convolutional Neural Network (CNN), and may include Channel Attention, Normalization, and convolution (Conv) layer, Pixel Shuffle and/or Activation layer. By performing the channel attention, channels associated with the frame index may be used in training and/or processing the input video, and unrelated channels may be excluded during training and/or processing.

In operation 530, the method may include outputting a final frame representation by connecting the clip representation and the residual frame representation. For example, the video processing apparatus may output a final frame representation by connecting the clip representation and the residual frame representation.

In operation 540, the method may include outputting a predicted frame by inputting the final frame representation to the decoder. For example, the video processing apparatus may output a predicted frame by inputting the final frame representation to the decoder. The decoder may be a Convolutional Neural Network, and may include channel attention, normalization, pixel shuffle, convolution, and activation layer.

Figure 8:
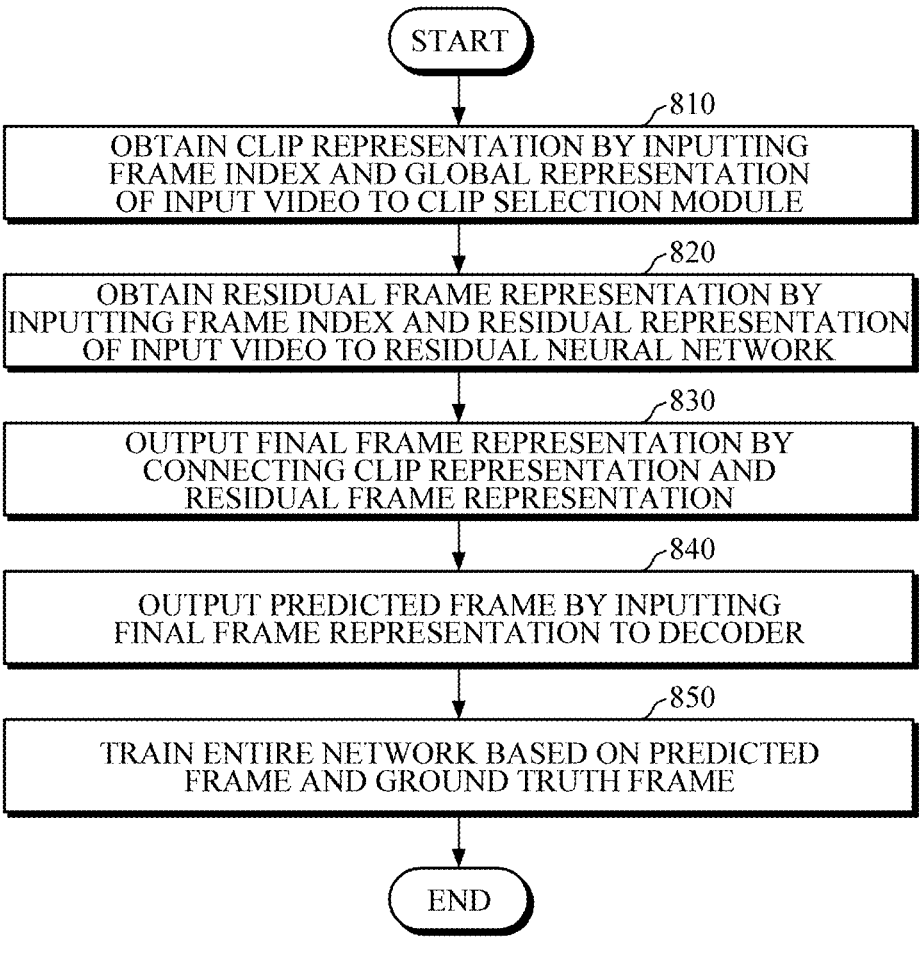
FIG. 8 is a flowchart illustrating a video processing method according to another embodiment of the disclosure.

FIG. 8 is a flowchart illustrating a video processing method according to another embodiment of the disclosure.

The method of FIG. 8 is an example of a video processing method performed by the video processing apparatus 100, 200a, and 200b described above.

Referring to FIG. 8, as described above, the video processing method may include obtaining a clip representation by inputting a frame index and a global representation of an input video to the clip selection module in 810, obtaining a residual frame representation by inputting the frame index and a residual representation of the input video to the residual neural network in 820, and outputting a final frame representation by connecting the clip representation and the residual frame representation in 830. Moreover, the method may include outputting a predicted frame by inputting the final frame representation to the decoder in 840. The method may further include training the entire network based on the predicted frame and a ground truth frame in 850. The video processing apparatus may train the network by using a Back-Propagation method. By setting various loss functions, the video processing apparatus may perform training so that loss may be minimized. In this case, the video processing apparatus may perform training by considering temporal redundancy during video processing, considering whether the video is static or dynamic, whether there is a scene change, etc., thereby increasing the efficiency of video processing during inference.

Figure 9:
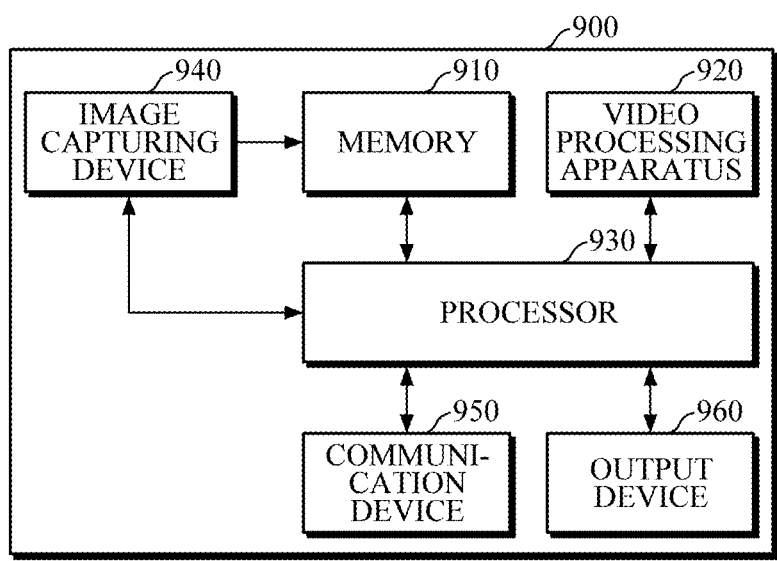
FIG. 9 is a block diagram illustrating an electronic device including a video processing apparatus according to an embodiment of the disclosure.

FIG. 9 is a block diagram illustrating an electronic device including a video processing apparatus according to an embodiment of the disclosure.

Referring to FIG. 9, an electronic device 900 includes a memory 910, a video processing apparatus 920, a processor 930, an image capturing device 940, a communication device 950, and an output device 960. According to another embodiment, the electronic device 900 may not include some or all of the image capturing device 940, the communication device 950, and the output device 960. According to another embodiment, the electronic device 900 may not include other components in addition to some or all of the video processing apparatus 920 the image capturing device 940, the communication device 950, and the output device 960. According to an embodiment, the electronic device may include, but is not limited, to a computer, a laptop, a smartphone, a wearable device, an Internet of Things (IoT) device), etc.

The memory 910 may store instructions executed by the processor 930 for training and processing a video. In addition, the memory 910 may store data for video processing by the video processing apparatus 920. For example, the memory 910 may store video to be processed, preprocessed data (e.g., global representation, residual representation, etc.), the number of divided clips, neural network weights, and the like. Further, the memory 910 may store data generated during training and processing of a video by the video processing apparatus 920. For example, the memory 910 may store residual frame representation, clip representation, final frame representation, predicted frame, and the like. However, the disclosure is not limited thereto, and as such, may store other data. The memory 910 may include, but is not limited to, Random Access Memory (RAM), flash memory, cache memory, virtual memory, etc. The Random Access Memory (RAM) may include, but is not limited to, Dynamic Random Access Memory (DRAM), Static Random Access Memory (SRAM), etc.

The video processing apparatus 920 may include the components of the video processing apparatuses 100, 200a, and 200b described above in FIGS. 1, 2A and 2B. The video processing apparatus 920 as a whole may be formed as a hardware chip or a software module, but is not limited thereto. According to an embodiment, the video processing apparatus 920 may include some components implemented as hardware and other components implemented as software. For example, the video processing apparatus 920 may include a processor or a processing circuitry to execute the software to perform the operations of the video processing apparatus 920 described above. A detailed description of the video processing apparatus 920 will be omitted.

The processor 930 may control the overall operation of the components of the electronic device 900. The processor 910 may control operation of the components by executing the instructions stored in the memory 910, and may request video processing by sending a video stored in the memory 910 to the video processing apparatus 920. In addition, the processor 930 may control the image capturing device 940 to acquire a video to be processed. Further, the processor 930 may control the communication device 950 to transmit a processing result to another electronic device, and may control the output device 960 to provide the processing result to a user.

The image capturing device 940 may include a device, such as a camera, an imaging sensor, or the like, for capturing still images or moving images, etc. For example, the image capturing device 940 may include a lens assembly having one or more lenses, image sensors, image signal processors, and/or flashes. The lens assembly included in a camera module may collect light emanating from a subject to be imaged. The image capturing device 940 may store the captured images in the memory 910 and transmit the images to the processor 930.

The communication device 950 may support establishment of a direct (e.g., wired) communication channel and/or a wireless communication channel between the electronic device and other electronic device, a server, or the sensor device within a network environment, and performing of communication via the established communication channel, by using various communication techniques. The communication device 950 may transmit the images (e.g., still images or moving images) captured by the image capturing device 940, and/or the data (e.g., compressed video, decrypted video, etc.) processed by the processor 930 to another electronic device. In addition, the communication device 950 may receive a video to be processed from a cloud device or another electronic device, may store the received video in the memory 910.

The output device 960 may visually/non-visually output the images captured by the image capturing device 940, and/or data processed by the processor 930. The output device 960 may include a sound output device, a display device (e.g., display), an audio module, and/or a haptic module. The output device 960 may display results generated by the video processing apparatus 920, processing results of the processor 930, and the like on the display, thereby improving user's video experience.

In addition, the electronic device 900 may further include a sensor device (e.g., acceleration sensor, gyro sensor, magnetic field sensor, proximity sensor, illuminance sensor, fingerprint sensor, etc.) configured to detect various data, an input device (e.g., a microphone, a mouse, a keyboard, and/or a digital pen (e.g., a stylus pen, etc.), etc.) configured to receive commands and/or data to be used from a user, and the like.

Embodiments of the disclosure may be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the invention can be readily inferred by programmers of ordinary skill in the art to which the invention pertains.

The disclosure has been described herein with regard to preferred embodiments. However, it will be obvious to those skilled in the art that various changes and modifications can be made without changing technical conception and essential features of the disclosure. Thus, it is clear that the above-described embodiments are illustrative in all aspects and are not intended to limit the disclosure.

What is claimed is:

1. A video processing method comprising:
obtaining a clip representation based on a frame index and a global representation of an input video;
obtaining a residual frame representation based on the frame index and a residual representation of the input video using a residual neural network; and
outputting a final frame representation generated based on the clip representation and the residual frame representation.

2. The video processing method of claim 1, wherein the obtaining of the clip representation comprises:
dividing the global representation of the input video into a plurality of clips; and
selecting one or more first clips from the plurality of clips based on the frame index.

3. The video processing method of claim 2, wherein the obtaining of the clip representation further comprises:
setting one or more second clips, which are not selected as the one or more first clips from the plurality of clips, to zero tensor; and
combining the one or more first clips and the one or more second clips.

4. The video processing method of claim 2, wherein the dividing comprises:
determining whether the input video is static or dynamic; and
based on the determination, adaptively adjusting a number of the plurality of clips.

5. The video processing method of claim 4, wherein the determining whether the input video is static or dynamic comprises:
calculating a Mean Squared Error (MSE) between a first frame and a second frame of the input video, and
based on the calculated MSE being less than or equal to a threshold value, determining that the input video is static, and based on the calculated MSE exceeding the threshold value, determining that the input video is dynamic.

6. The video processing method of claim 4, wherein the number of the plurality of clips is a first number in a case in which the input video is dynamic, and the number of the plurality of clips is a second number in a case in which the input video is static, the first number being larger than the second number.

7. The video processing method of claim 2, wherein the selecting of the one or more first clips comprises selecting the one or more first clips based on the frame index and a distance between the plurality of clips.

8. The video processing method of claim 7, wherein the selecting of the one or more first clips comprises selecting a first clip and a second clip, among the plurality of clips, that are closer to the frame index than other clips in the plurality of clips, and
wherein the first clip is on a first side of the frame index and the second clip is on a second side of the frame index opposite to the first side.

9. The video processing method of claim 2, wherein the dividing comprises:

detecting a scene change point in the input video; and dividing the plurality of clips with different depths based on the detected scene change point.

10. The video processing method of claim 1, wherein the outputting of the residual frame representation comprises performing channel attention by using the residual representation as an input.

11. The video processing method of claim 10, wherein the outputting of the residual frame representation further comprises performing normalization by using the frame index and a result of the channel attention as input.

12. The video processing method of claim 11, wherein the normalization comprises Instance Normalization.

13. The video processing method of claim 11, wherein the outputting of the residual frame representation further comprises performing at least one of convolution, pixel shuffle, or activation based on a result of the normalization.

14. The video processing method of claim 1, further comprising outputting a predicted frame by inputting the final frame representation to a decoder.

15. The video processing method of claim 1, further comprising training a clip selection model and the residual neural network by using the predicted frame and a ground truth frame.

16. A video processing apparatus comprising:

a memory storing one or more instructions; and a processor configured to execute the one or more instructions to:

obtain a clip representation based on a frame index and a global representation of an input video;

obtain a residual frame representation based on the frame index and a residual representation of the input video using a residual neural network; and output a final frame representation generate based on the clip representation and the residual frame representation.

17. The video processing apparatus of claim 16, wherein the processor is further configured to generate the clip representation by:

adaptively dividing the global representation into a plurality of clips based on at least one of whether the input video is static or dynamic or whether there is a scene change point, and selecting one or more of the plurality of clips.

18. The video processing apparatus of claim 16, further comprising a decoder configured to output a predicted frame based on the final frame representation.

19. The video processing apparatus of claim 16, wherein the processor is further configured to train a clip selection model and the residual neural network based on the predicted frame and a ground truth frame.

20. An electronic device comprising:

a storage configured to store a video;

a video processing apparatus configured to process the video and output a result of the processing; and wherein the video processing apparatus comprises:

a memory storing one or more instructions; and a processor configured to execute the one or more instructions to:

obtain a clip representation based on a frame index and a global representation of an input video;

obtain a residual frame representation based on the frame index and a residual representation of the input video using a residual neural network; and output a final frame representation generate based on the clip representation and the residual frame representation.

* * * * *